United States Patent
Dixon et al.

(10) Patent No.: US 11,698,144 B2
(45) Date of Patent: Jul. 11, 2023

(54) SPRING RETURN VALVE HANDLE

(71) Applicant: Swagelok Company, Solon, OH (US)

(72) Inventors: Matthew Dixon, Parma, OH (US);
Karim Mahraz, Willoughby, OH (US)

(73) Assignee: Swagelok Company, Solon, OH (US)

( * ) Notice: Subject to any disclaimer, the term of this patent is extended or adjusted under 35 U.S.C. 154(b) by 0 days.

(21) Appl. No.: 17/568,058

(22) Filed: Jan. 4, 2022

(65) Prior Publication Data

US 2022/0228672 A1 Jul. 21, 2022

Related U.S. Application Data

(60) Provisional application No. 63/137,818, filed on Jan. 15, 2021.

(51) Int. Cl.
*F16K 31/60* (2006.01)
*F16K 31/04* (2006.01)
(Continued)

(52) U.S. Cl.
CPC .......... *F16K 31/60* (2013.01); *F16K 5/0647* (2013.01); *F16K 31/04* (2013.01); *F16K 31/602* (2013.01); *F16K 37/0008* (2013.01)

(58) Field of Classification Search
CPC ............. F16K 5/0647; F16K 31/602; F16K 2200/305; F16K 31/53; F16K 31/04; F16K 31/06; F16K 37/008
(Continued)

(56) References Cited

U.S. PATENT DOCUMENTS 32,444 A * 5/1861 De Bolle ............ F16K 5/0647
251/305
232,050 A * 9/1880 Moran ................ B62D 5/097
251/243
(Continued)

FOREIGN PATENT DOCUMENTS

CA 2461300 A 9/2005
CA 2461300 A1 * 9/2005 ............ F16K 21/08
(Continued)

OTHER PUBLICATIONS

International Search Report and Written Opinion from PCT/US2022/011074 dated Apr. 20, 2022.
(Continued)

*Primary Examiner* — Umashankar Venkatesan
(74) *Attorney, Agent, or Firm* — Calfee, Halter & Griswold LLP

(57) ABSTRACT

A valve assembly includes a valve body defining an interior cavity extending to a bonnet portion, a valve stem including a valve element retained in the interior cavity of the valve body and an end portion extending beyond the bonnet portion, the valve stem being rotatable between a first limit position and a second limit position, and a spring return handle arrangement. The spring return handle arrangement includes a user graspable valve handle, a stem adapter, and a return spring. The stem adapter includes a first end portion secured to the valve stem and a second end portion secured to the valve handle. The return spring includes a first end portion secured to the valve body, an intermediate spring loaded portion, and a second end portion secured to the stem adapter to apply a torsional load to the stem adapter for returning the valve stem to the first rotational limit position.

20 Claims, 3 Drawing Sheets

(51) Int. Cl.
*F16K 5/06* (2006.01)
*F16K 37/00* (2006.01)

(58) Field of Classification Search
USPC ............... 251/246, 244, 243, 242, 236, 231
See application file for complete search history.

(56) References Cited

U.S. PATENT DOCUMENTS

| | | | | |
|---|---|---|---|---|
| 932,188 | A * | 8/1909 | Strelezky | F16K 31/602 251/99 |
| 979,344 | A * | 12/1910 | Shallow | F16K 31/52408 267/155 |
| 992,502 | A * | 5/1911 | Hollis | F16K 5/0647 251/292 |
| 1,011,260 | A * | 12/1911 | Spinney | F16K 35/06 251/324 |
| 2,061,716 | A * | 11/1936 | Best | F16K 3/08 251/231 |
| 2,768,806 | A * | 10/1956 | Koehler | F16K 5/208 251/363 |
| 3,461,894 | A * | 8/1969 | MacLennan | F16K 31/53 137/66 |
| 3,827,671 | A * | 8/1974 | Bolden | F16K 5/0647 251/297 |
| 3,940,107 | A * | 2/1976 | Allenbaugh, Jr. | F16K 5/0631 251/315.08 |
| 4,301,823 | A * | 11/1981 | Meisenheimer, Jr. | F16L 55/1015 137/75 |
| 4,376,445 | A * | 3/1983 | Meisenheimer, Jr. | F16L 55/1015 137/75 |
| 4,779,840 | A * | 10/1988 | Andrea | F16K 5/0642 251/315.14 |
| 11,079,039 | B2 * | 8/2021 | Karber | F16K 31/60 |

FOREIGN PATENT DOCUMENTS

| | | |
|---|---|---|
| CN | 201795079 | 4/2011 |
| JP | S5012194 | 2/1975 |
| JP | S56115077 | 9/1981 |

OTHER PUBLICATIONS

One page brochure, Mechatest B.V., Spring Return Handle, Mechatest for Swagelok Valves, published before Jan. 15, 2021.
One page brochure, Kinetrol USA, Spring Return "Deadman" Handles: Certainty of Valve Position When Unattended, published before Jan. 15, 2021.
One page brochure, Mechatest B.V., Spring Return Handle, Mechatest for Swagelok and Hoke Valves, published before Jan. 15, 2021.

* cited by examiner

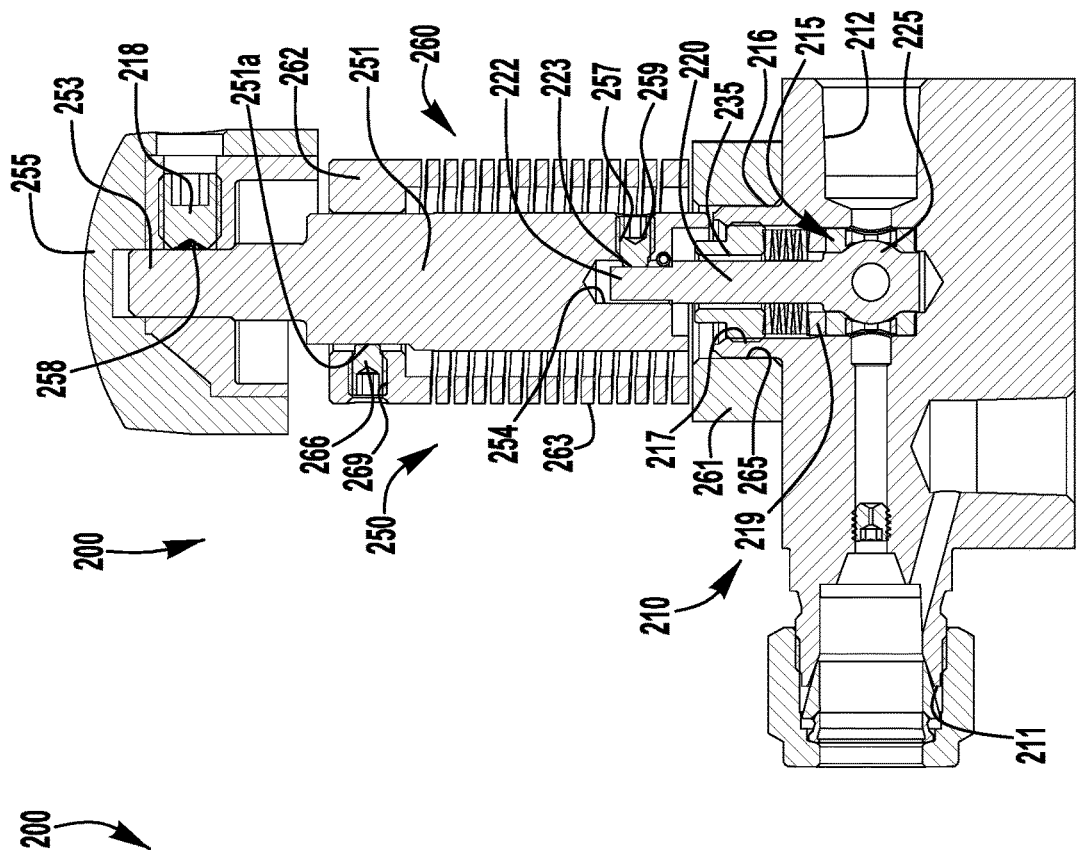
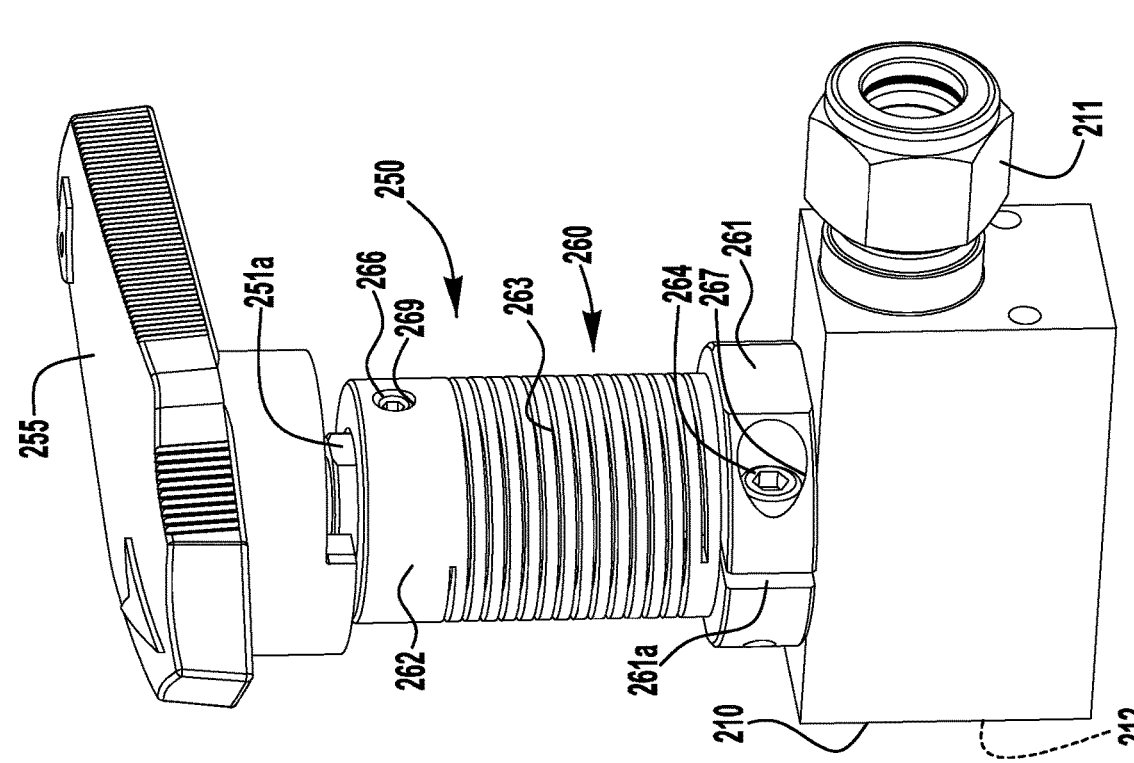

SPRING RETURN VALVE HANDLE

CROSS-REFERENCE TO RELATED APPLICATION

This application claims priority to and all benefit of U.S. Provisional Patent Application Ser. No. 63/137,818, filed on Jan. 15, 2021, for SPRING RETURN VALVE HANDLE, the entire disclosure of which is fully incorporated herein by reference.

TECHNICAL FIELD

The present disclosure relates to spring return handles. More particularly, the disclosure relates to spring return valve handles for rotary actuated valves.

BACKGROUND

Manually operated fluid control valves are used in many applications. As one example, a grab sample panel provided with a primary process line includes manually operated sampling valves for selectively dispensing samples of the process fluid in sample containers or bottles. In such applications, the failure of the operator to fully close the valve (e.g., by manually rotating the valve handle to the closed position) can result in undesirable release of fluid and potential resulting safety concerns, contamination, and production losses.

SUMMARY OF THE DISCLOSURE

In accordance with an exemplary aspect of one or more of the inventions presented in this disclosure, a valve assembly includes a valve body defining an interior cavity extending to a bonnet portion, a valve stem including a valve element retained in the interior cavity of the valve body and an end portion extending beyond the bonnet portion, the valve stem being rotatable between a first limit position and a second limit position, and a spring return handle arrangement. The spring return handle arrangement includes a user graspable valve handle, a stem adapter, and a return spring. The stem adapter includes a first end portion secured to the valve stem and a second end portion secured to the valve handle. The return spring includes a first end portion secured to the valve body, an intermediate spring loaded portion, and a second end portion secured to the stem adapter to apply a torsional load to the stem adapter for returning the valve stem to the first rotational limit position.

In accordance with another exemplary aspect of one or more of the inventions presented in this disclosure, a method is provided for installing a spring return handle arrangement on a valve having a valve stem extending from a bonnet portion of a valve body. In the exemplary method, a first end portion of a stem adapter is secured to the end portion of the valve stem, with a second end portion of the stem adapter being secured with a user graspable valve handle. A first end portion of a return spring is secured to the valve body, and a second end portion of the return spring is secured to the stem adapter, such that an intermediate spring loaded portion of the return spring applies a torsional load to the stem adapter for returning the valve stem to the first rotational limit position.

In accordance with another exemplary aspect of one or more of the inventions presented in this disclosure, a valve assembly includes a valve body defining an interior cavity extending to a bonnet portion, a valve stem including a valve element retained in the interior cavity of the valve body and an end portion extending beyond the bonnet portion, the valve stem being rotatable between a first limit position and a second limit position, and a spring return handle arrangement. The spring return handle arrangement includes a user graspable valve handle, a stem adapter having a first end portion secured to the valve stem and a second end portion secured to the valve handle, and a return spring having a first end collar secured to the bonnet portion of the valve body, an intermediate spring loaded portion, and a second end collar secured to an outer surface of the stem adapter to apply a torsional load to the stem adapter for returning the valve stem to the first rotational limit position.

In accordance with another exemplary aspect of one or more of the inventions presented in this disclosure, a method is provided for installing a spring return handle arrangement on a valve having a valve stem extending from a bonnet portion of a valve body. In the exemplary method, a first end portion of a stem adapter is secured to the end portion of the valve stem, wherein a second end portion of the stem adapter is secured with a user graspable valve handle. A first end collar of a return spring is secured to the bonnet portion of the valve body. A second end collar of the return spring is secured to an outer surface of the stem adapter, such that an intermediate spring loaded portion of the return spring applies a torsional load to the stem adapter for returning the valve stem to the first rotational limit position.

BRIEF DESCRIPTION OF THE DRAWINGS

FIG. 1 is a perspective view of a valve assembly with a spring return handle arrangement, according to an exemplary embodiment of the present disclosure;

FIG. 2 is a cross-sectional view of the valve assembly of FIG. 1;

DESCRIPTION OF THE EXEMPLARY EMBODIMENTS

Figure 3:
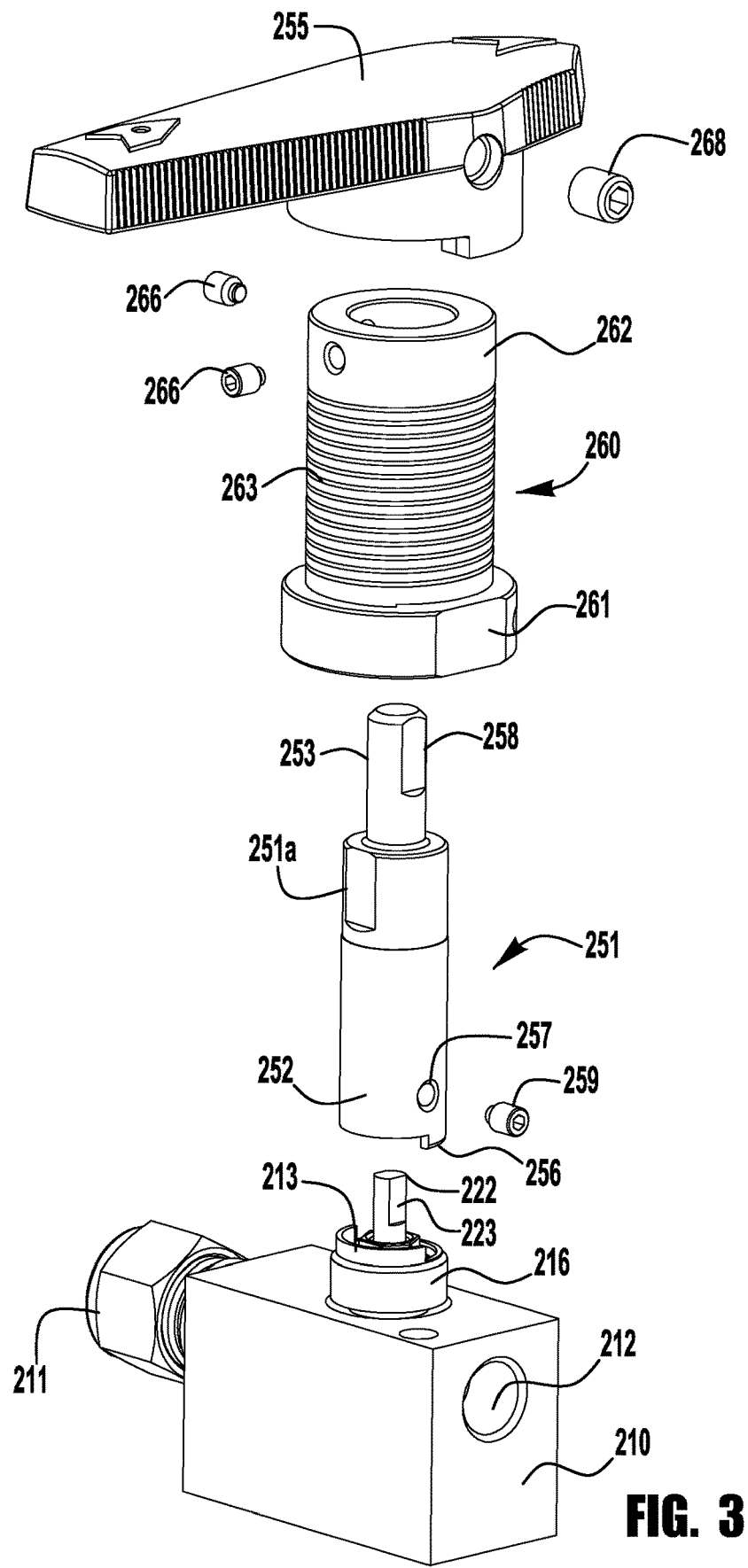
FIG. 3 is an exploded perspective view of the valve assembly of FIG. 1.
Figure 5:
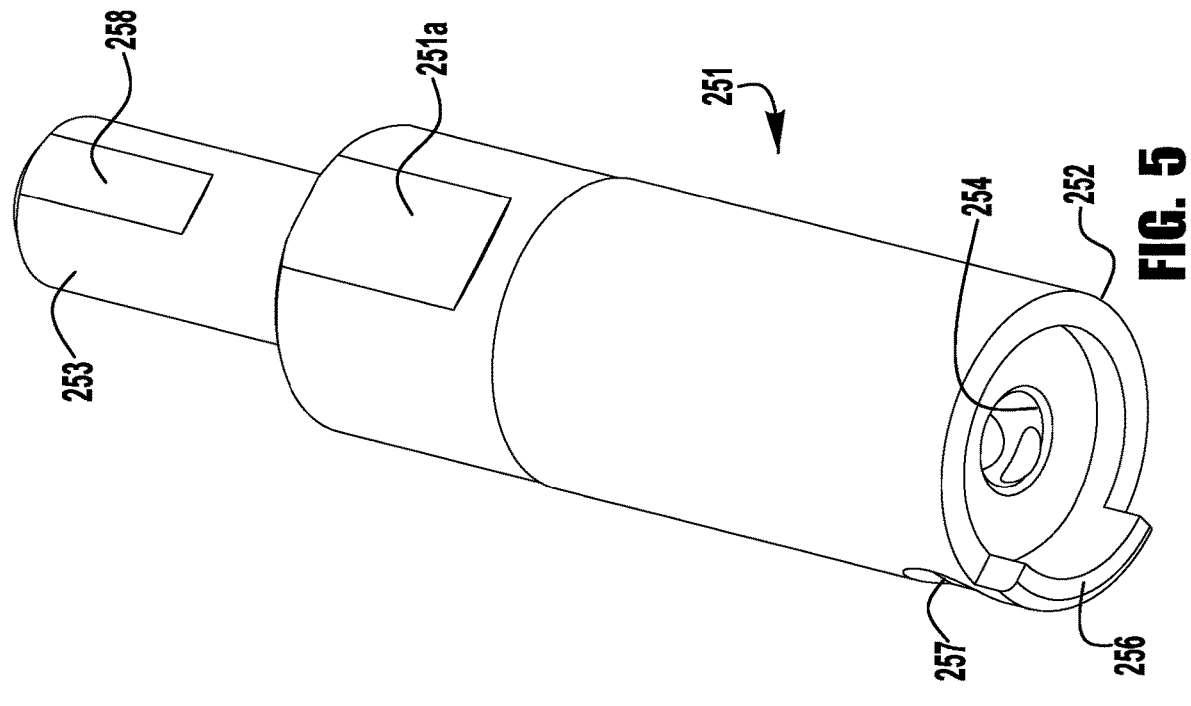
FIG. 5 is a lower perspective view of the stem adapter of the valve assembly.

This Detailed Description merely describes exemplary embodiments and is not intended to limit the scope of the claims in any way. Indeed, the invention as claimed is broader than and unlimited by the exemplary embodiments, and the terms used in the claims have their full ordinary meaning. For example, while an illustrated exemplary embodiment disclosed herein describes spring return valve handle arrangements for quarter-turn ball valves, the features of the present disclosure may additionally or alternatively be applied to other types of manually actuated valves (e.g., plug valves, needle valves, diaphragm valves, etc.) or valves having handles operable over different ranges of motion (e.g., half-turn or 180°, three-quarter turn or 270°, or any other suitable degree of rotation).

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

In many applications, it may be desirable to provide a mechanism for ensuring that a manually actuated valve is returned to a desired condition (e.g., closed condition) when the manual actuator (e.g., handle) is released by the operator, for example, to prevent undesired fluid flow. Such mechanisms are often referred to as "deadman's" handles.

According to exemplary aspects of the present disclosure, a spring return handle arrangement may be provided with a user graspable valve handle, a stem adapter, and a return spring. In an exemplary arrangement, the stem adapter includes a first end portion secured to a protruding valve stem and a second end portion secured to a user graspable valve handle. The return spring may include a first end portion secured to the valve body, an intermediate spring loaded portion (e.g., torsion spring coil), and a second end portion secured to the stem adapter to apply a torsional load to the stem adapter for returning the valve stem to a first rotational limit position.

Many different arrangements may be utilized to secure a return spring to a valve body and stem adapter. As one example, a return spring may include a first end collar secured to the valve body and a second end collar secured to the stem adapter, with an intermediate spring loaded portion (e.g., torsion spring coil). While the return spring end collars may be attached to the spring loaded portion using a variety of arrangements (e.g., fasteners, coil wire end in drilled hole of collar, welding), in an exemplary arrangement, the end collars are integrally formed with the spring loaded portion as a unitary or monolithic component, for example, by machining or additive manufacturing (e.g., 3D printing). Such arrangements may avoid an unbalanced side load between the return spring and the stem adapter/valve handle that may result from an offset engagement of the return spring with a fastener, pin/aperture, or other attachment feature.

FIGS. 1-3 illustrate an exemplary embodiment of a manually actuated valve 200 including a spring return handle arrangement 250. The valve 200 includes a valve body 210 defining an interior cavity 215 retaining a valve element (e.g., ported ball portion) 225 connected or secured with (e.g., integral to or assembled with) a valve stem 220. The valve stem 220 is rotatable between a first position (e.g., a closed position in which a ball orifice 226 in the ball portion 225 is misaligned with first and second end ports 211, 212 in the valve body 210 to block passage of fluid through the valve 200), and a second position (e.g., an open position in which a ball orifice is rotated into alignment with valve body end ports to allow passage of fluid through the valve 200). In the illustrated embodiment, the valve includes a seat and stem sealing arrangement 219 in the valve cavity 215 to seal the valve against seat and stem leakage. In other embodiments, other sealing arrangements may be utilized. Further, while the illustrated embodiment includes a valve closure or shutoff valve element, other types of valve elements may be used, including, for example, flow regulating or flow switching valve elements.

The interior cavity 215 of the valve body 210 extends to a bonnet portion 216 having an internal threaded portion 217 for assembly of a stem nut 235 retaining the valve stem 220 with the valve body. The valve stem 220 includes an end portion 222 that extends beyond the bonnet portion 216 for attachment to the spring return handle arrangement 250, as described below.

According to an aspect of the present disclosure, the spring return handle arrangement 250 includes a stem adapter 251 connecting a valve handle 255 to the valve stem 220 and a return spring 260 having a first end portion 261 secured to the valve body 210, a second end portion 262 secured to the stem adapter 251, and an intermediate spring loaded portion 263 under torque to apply a torsional load to the stem adapter 251 and valve stem 220, for returning the valve stem 220 to the first (e.g., closed) rotational limit position.

In the illustrated embodiment, the stem adapter 251 includes a first end portion 252 securable to the valve stem end portion 222 and a second end portion 253 securable to the valve handle 255. Many different securing mechanisms may be used to secure the stem adapter 251 to the valve stem end portion 222. In the illustrated embodiment, the first end portion 252 of the stem adapter 251 includes a stem bore 254 receiving the valve stem end portion 222 and a radially extending threaded bore 257 that intersects the stem bore 254 and retains a stem engaging member (e.g., set screw) 259 that engages a flatted portion 223 on the valve stem end portion 222. Many different securing mechanisms may be used to secure the stem adapter 251 to the valve handle 255. In the illustrated embodiment, the second end portion 253 forms a stem extension having a flatted portion 258 for attachment to the valve handle 255 (e.g., using set screw 268). In other embodiments (not shown), the valve handle may be integrally formed with the stem extension to secure the valve handle to the stem adapter.

In the illustrated embodiment, the first end portion 252 of the stem adapter 251 includes a protrusion (e.g., quarter-circular broach) 256 that engages an end portion (e.g., semicircular broach) 213 of the bonnet 216 to define the first and second limit positions of the valve stem 220.

The first and second end portions 261, 262 of the return spring 260 may be secured to the valve body 210 and stem adapter 251 using a variety of configurations. In the illustrated embodiment, the first end portion 261 of the return spring 260 is a first end collar secured to the bonnet portion 216 of the valve body 210. In an exemplary embodiment, the first end collar 261 may include an internal threaded portion 265 threadably assembled with an outer threaded portion on the bonnet portion 216 of the valve body 210. As shown, the first end collar 261 may include two or more flats to facilitate wrench-tightening of the first end collar on the bonnet portion 216. Additionally or alternatively, as shown, the first end collar 261 may include a threaded fastener 264 installed through a fastener bore 267 that spans a split collar portion 261a, with the fastener being tightened for clamping engagement of the first end collar 261 with the bonnet portion 216 of the valve body 210. As shown, an opposite side of the first end collar 261 may include a slotted portion 261b aligned with the split collar portion 261a to facilitate clamping compression of the split collar portion. In some such embodiments, the internal threading of the first end collar may be eliminated, with clamping engagement of the first end collar against the bonnet portion sufficient to secure the first end collar in a desired rotational position.

Figure 4:
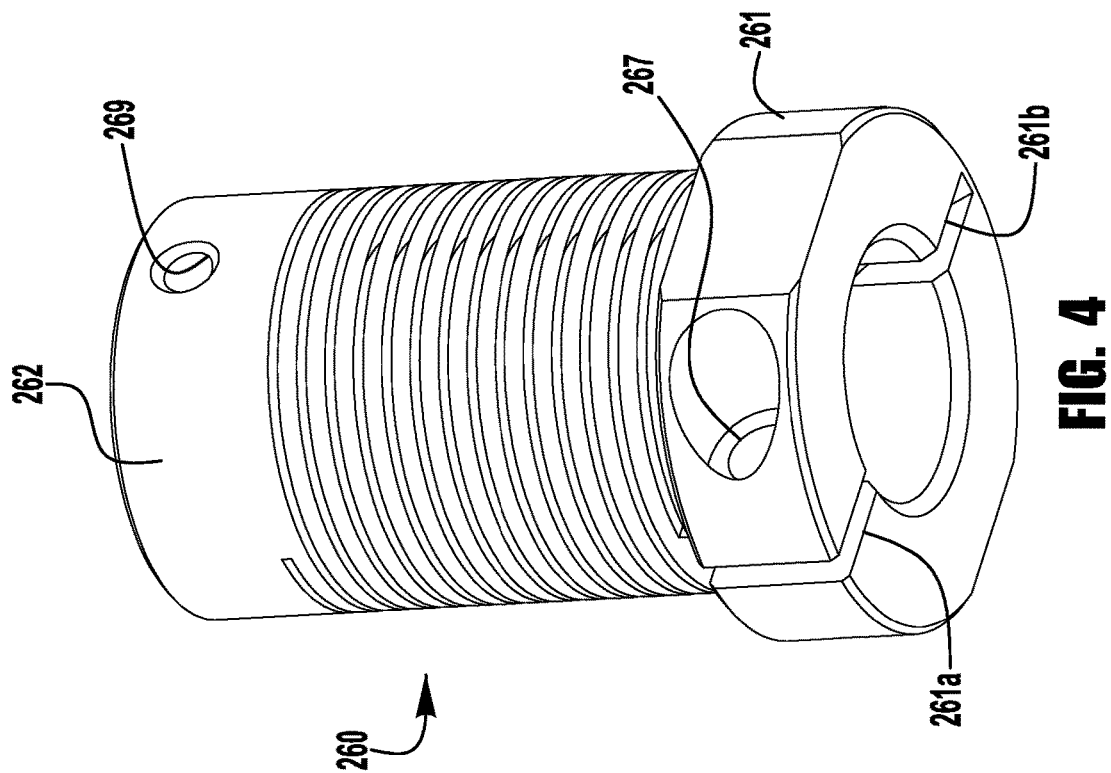
FIG. 4 is a lower perspective view of the return spring of the valve assembly of FIG. 1.

In the illustrated embodiment, the second end portion 262 of the return spring 260 is a second end collar secured to an outer surface 251a of the stem adapter 251 by one or more set screws 266 installed through threaded aperture 269 and tightened against corresponding flatted portions of the outer surface 251a. As shown in FIG. 4, the return spring may be a unitary or monolithic component, with the first and second end collars 261, 262 integrally formed with, and extending from, the helical coiled intermediate spring loaded portion 263. As shown the second end collar 262 may have an outer diameter that substantially matches an outer diameter of the intermediate spring loaded portion 263 of the return spring 260. Use of a machined torsion spring, as shown, may allow for custom attachments, such as the end collar attachments described herein, thereby eliminating additional torsion-bearing connections between the spring and the valve stem and handle. As a result, the unitary spring may apply a "pure moment," meaning that the return spring does not apply a translative (side load) force. This may allow for the elimination of one or more external stabilizing components that could otherwise be needed. Additionally, the exterior appearance of the integrally formed return spring, as an external component, may be more aesthetically pleasing than other spring and spring connection arrangements.

In an exemplary method of installing the spring return handle arrangement 250 on the valve 200 having a valve stem 220 extending from a bonnet portion 216 of the valve body 210, the end portion 222 of the valve stem 220 is inserted into the stem bore 254 in the first end portion 252 of the stem adapter 251, and the set screw 259 is tightened against the flatted portion 223 of the valve stem end portion. The return spring 260 is installed or slipped over the stem adapter 251, and, if the first end collar 261 is provided with internal threads 265, the first end collar is threaded onto the bonnet portion 216 of the valve body 210. The second end collar 262 of the return spring 260 is secured to the outer flatted surface 251a of the stem adapter 251 by tightening the set screw(s) 266. The valve handle 255 is secured to the stem extension 253 of the stem adapter 251 by tightening set screw 268. With the valve handle 255, stem adapter 251, and valve stem 220 rotated to the first limit position (e.g., closed position), the first end collar 261 is positioned (e.g., by further rotation) on the bonnet to maintain a torsional load or torque on the intermediate spring loaded portion 263. The split collar portion 261a of the first end collar is then tightened against the bonnet portion 216 to secure the first end collar 261 in this torque maintaining rotational position, such that when the valve handle 255 and stem 220 are rotated away from the first limit position and released, the torsional load of the intermediate spring loaded portion 263 is sufficient to return the valve handle and stem to the first limit position.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A valve assembly comprising:
   a valve body defining an interior cavity extending to a bonnet portion;
   a valve stem including a valve element retained in the interior cavity of the valve body and an end portion extending beyond the bonnet portion, the valve stem being rotatable between a first limit position and a second limit position; and
   a spring return handle arrangement including:
      a user graspable valve handle;
      a stem adapter having a first end portion secured to the valve stem and a second end portion secured to the valve handle; and
      a return spring having a first end portion comprising a first end collar secured to the bonnet portion of the valve body, an intermediate spring loaded portion, and a second end portion secured to the stem adapter to apply a torsional load to the stem adapter for returning the valve stem to the first rotational limit position.

2. The valve assembly of claim 1, wherein the first end portion of the stem adapter includes a stem bore receiving the end portion of the valve stem.

3. The valve assembly of claim 1, wherein the second end portion of the stem adapter includes a stem extension assembled with the valve handle.

4. The valve assembly of claim 1, wherein the first end portion of the stem adapter includes a protrusion that engages the bonnet to define the first and second limit positions of the valve stem.

5. The valve assembly of claim 1, wherein the first end collar includes an internal threaded portion threadably assembled with the bonnet portion of the valve body.

6. The valve assembly of claim 1, wherein the first end collar comprises a split collar, wherein a fastener is assembled with the first end collar for clamping engagement of the split collar with the bonnet portion of the valve body.

7. The valve assembly of claim 1, wherein the first end collar is integrally formed with the intermediate spring loaded portion of the return spring.

8. A valve assembly comprising:
   a valve body defining an interior cavity extending to a bonnet portion;
   a valve stem including a valve element retained in the interior cavity of the valve body and an end portion extending beyond the bonnet portion, the valve stem being rotatable between a first limit position and a second limit position; and a spring return handle arrangement including:
a user graspable valve handle;
a stem adapter having a first end portion secured to the valve stem and a second end portion secured to the valve handle; and a return spring having a first end portion secured to the valve body, an intermediate spring loaded portion, and a second end portion secured to the stem adapter to apply a torsional load to the stem adapter for returning the valve stem to the first rotational limit position, wherein the second end portion of the return spring comprises a second end collar secured to an outer surface of the stem adapter.

9. The valve assembly of claim 8, wherein the second end collar is secured to the outer surface of the stem adapter by at least one set screw.

10. The valve assembly of claim 8, wherein the second end collar is integrally formed with the intermediate spring loaded portion of the return spring.

11. The valve assembly of claim 10, wherein the second end collar has an outer diameter that substantially matches an outer diameter of the intermediate spring loaded portion of the return spring.

12. The valve assembly of claim 8, wherein the first end portion of the return spring comprises a first end collar secured to the bonnet portion of the valve body.

13. A method of installing a spring return handle arrangement on a valve having a valve stem extending from a bonnet portion of a valve body, the method comprising:
securing a first end portion of a stem adapter to the end portion of the valve stem having first and second rotational limit positions, wherein a second end portion of the stem adapter is secured with a user graspable valve handle;
securing a first end portion of a return spring to the valve body; and
securing a second end portion of the return spring to the stem adapter, such that an intermediate spring loaded portion of the return spring applies a torsional load to the stem adapter for returning the valve stem to the first rotational limit position.

14. The method of claim 13, wherein securing the first end portion of the stem adapter to the end portion of the valve stem includes receiving the end portion of the valve stem in a stem bore in the first end portion of the stem adapter.

15. The method of claim 13, further comprising assembling the valve handle to a stem extension of the second end portion of the stem adapter.

16. The method of claim 13, wherein securing the first end portion of the return spring to the valve body comprises securing a first end collar of the first end portion of the return spring to the bonnet portion of the valve body.

17. The method of claim 16, wherein securing the first end collar to the bonnet portion includes threadably assembling an internal threaded portion of the first end collar with the bonnet portion.

18. The method of claim 16, wherein the first end collar comprises a split collar, and wherein securing the first end collar to the bonnet portion comprises tightening a fastener with the first end collar for clamping engagement of the split collar with the bonnet portion of the valve body.

19. The method of claim 16, wherein securing the second end portion of the return spring to the stem adapter comprises securing a second end collar of the second end portion of the return spring to an outer surface of the stem adapter.

20. The method of claim 19, wherein securing the second end collar to the outer surface of the stem adapter comprises tightening at least one set screw assembled with the first end collar against the outer surface of the stem adapter.

* * * * *